United States Patent [19]

Berman et al.

[11] Patent Number: 5,412,370

[45] Date of Patent: May 2, 1995

[54] CAR THEFT PREVENTION DEVICE

[76] Inventors: Leonard C. Berman, 8308 Regents Rd., Suite 1H, San Diego, Calif. 92122; Joseph C. Noe, 14636 Evening Star Dr., Poway, Calif. 92064

[21] Appl. No.: 7,144

[22] Filed: Jan. 21, 1993

Related U.S. Application Data

[63] Continuation-in-part of Ser. No. 965,594, Oct. 23, 1992, abandoned.

[51] Int. Cl.⁶ ............................................. B60R 25/10
[52] U.S. Cl. ..................................... 340/426; 340/430; 340/527; 307/10.2; 180/287
[58] Field of Search ................ 340/425.5, 426, 430, 340/527; 307/10.2; 180/287

[56] References Cited

U.S. PATENT DOCUMENTS

| | | | |
|---|---|---|---|
| 3,639,897 | 2/1972 | Teich | 340/430 |
| 3,656,100 | 4/1972 | Beltrami | 340/430 |
| 3,665,386 | 5/1972 | Dosch | 340/426 |
| 3,728,674 | 4/1973 | Kahn | 340/426 |
| 4,259,664 | 3/1981 | Boisclair | 340/426 |
| 4,792,792 | 12/1988 | Costino | 340/426 |
| 4,857,888 | 8/1989 | Torres | 340/426 |
| 4,884,055 | 11/1989 | Memmola | 340/426 |
| 5,041,810 | 8/1991 | Gotanda | 340/426 |
| 5,172,094 | 12/1992 | Stadler | 340/430 |
| 5,298,878 | 3/1994 | Smith | 340/426 |
| 5,307,048 | 4/1994 | Sonders | 340/426 |

OTHER PUBLICATIONS

San Diego Union-Tribune article, Oct. 20, 1992, p. B1 titled "Firms Create Devices to Foil Carjackers".

*Primary Examiner*—John K. Peng
*Assistant Examiner*—Edward Lefkowitz

[57] ABSTRACT

A system and method for preventing the unauthorized starting and driving away of a vehicle. The vehicle cannot be started unless a secret starting sequence is initiated, and the vehicle will stall if a flight prevention sequence is initiated.

2 Claims, 5 Drawing Sheets

CAR THEFT PREVENTION DEVICE

RELATED APPLICATIONS

This application is a continuation-in-part of U.S. application Ser. No. 07/965,594, filed Oct. 23, 1992 by Leonard C. Berman and Joseph C. Noe entitled "Car Theft Prevention Device" now abandoned.

FIELD OF THE INVENTION

This invention is related generally to automotive theft prevention devices, and more particularly to a system and method for preventing unauthorized starting of the vehicle and preventing unauthorized flight of the vehicle should the vehicle be apprehended from the driver while he is driving.

BACKGROUND OF THE INVENTION

Automobile theft is on the rise today. Not only are cars being stolen from parking lots and garages, but a new crime, commonly known as "car jacking", has emerged. The crime of car jacking involves taking the car from the driver after the driver has already entered their vehicle. For example, people stopped at stoplights or entering parking lots at shopping stores are being confronted by armed robbers and forced to hand over their vehicles. Because car jacking necessarily involves a confrontation between the thief and the driver, the chances that personal injury will result are very high. Thus, the victim's best choice is to simply hand over the car.

When dealing with car theft in general, one key to reducing insurance costs is ensuring the vehicle is swiftly recovered. The longer that a thief has possession of the vehicle, the greater the likelihood that the car will be disassembled and its parts sold or that the car will be damaged or destroyed by a reckless joyriding thief. If the car is parked, preventing the thief from starting the car and driving away is the best defense against crime. However, when dealing with a carjacking, the thief is often armed. Thus, the best interests of the victim often dictate that the thief be able to flee the scene in the stolen car rather than remaining on the scene where he may retaliate against the victim.

Over the years, a variety of systems have been developed to make it more difficult for thieves to steal parked cars. Systems such as audible alarms are designed to draw unwanted attention to the thief as he attempts to gain entry into the vehicle and start it without first disarming the alarm. Other systems interrupt electric power to the starting system or fuel delivery system, making the car difficult to start without first disarming the alarm. However, these known systems have several disadvantages. First, most of these systems require the driver to arm the system before leaving his vehicle. Obviously, the driver may forget to arm the system or may choose not to arm the system when he is leaving his car for only short periods of time. Likewise, these systems must be disarmed by the driver before gaining successful entry into his vehicle and starting his vehicle. However, if the vehicle is attempted to be stolen after the driver has already gained entry and started the vehicle, there is no way for the driver to prevent the thief from driving away with the car.

It would therefore be advantageous to provide a system and method for preventing theft of an automobile. The system should always be active, allowing the system to arm automatically without requiring intervention from the driver. The system should also be difficult to defeat. It should prevent starting of the vehicle without first being disarmed, and it should be extremely difficult for the thief to learn how to disarm the system or bypass the system. Furthermore, it would be preferable if such a system had a means for preventing unauthorized flight of the vehicle. Ideally, such a system would cause the vehicle to stall and prevent its restarting by the thief. However, care must be taken to ensure that the vehicle does not stall when travelling at high speeds. Such a situation may cause injury to innocent bystanders when the stolen vehicle suddenly loses power when travelling at high speeds. Finally, it would be safer for the victim if the car stalled only after the thief had travelled far enough away so that the thief would be unable to retaliate against the victim.

SUMMARY OF THE INVENTION

It is therefore an object of the present invention to provide a system and method for preventing the theft of an automobile. The system and method of the present invention prohibits the unauthorized starting of the vehicle and prohibits unauthorized flight of the vehicle if it is stolen after it has been started. The system and method of the present invention interrupts power to both the starting circuit and fuel circuit to prevent unauthorized starting of the vehicle. Unauthorized flight of the vehicle is prevented by interrupting power to the fuel delivery circuit, causing the engine to stall. To reduce the risk of injury to bystanders and damage to the vehicle, the system and method of the present invention will not interrupt the fuel delivery system until the break pedal has been depressed for a predetermined period of time. This helps insure that the vehicle has begun slowing or has reached a stop before the fuel delivery system is interrupted. The system and method of the present invention also does not begin the fuel delivery interruption sequence until a predetermined length of time has expired. This allows the thief to depart the scene of the crime before the vehicle stalls. This reduces the risk of retaliation by the thief against the victim, and allows the victim a chance to contact police before the car stalls and the thief flees on foot. One advantage of the present invention is that the anti-theft system of the present invention is self arming. The driver is not required to arm the system when parking his car. Rather, the system is always active and must be disarmed every time the vehicle is attempted to be started. A further advantage of the present system is that the flight prevention feature allows the driver to initiate the flight prevention sequence as the car is being stolen, while allowing the thief a chance to travel a sufficient distance to reduce the chance that the thief will be able to retaliate against the driver once the flight prevention system becomes active and interrupts fuel delivery to the vehicle. Another feature of the present invention is, since the system is always active, once the vehicle stalls or is turned off by the thief, he will be unable to restart the vehicle unless he is able to determine the disarming sequence.

BRIEF DESCRIPTION OF THE DRAWINGS

These and other objects, features and advantages of the present invention can be better understood by referencing the following description in conjunction with the drawings in which.

DETAILED DESCRIPTION OF THE PREFERRED EMBODIMENTS

Figure 1A:
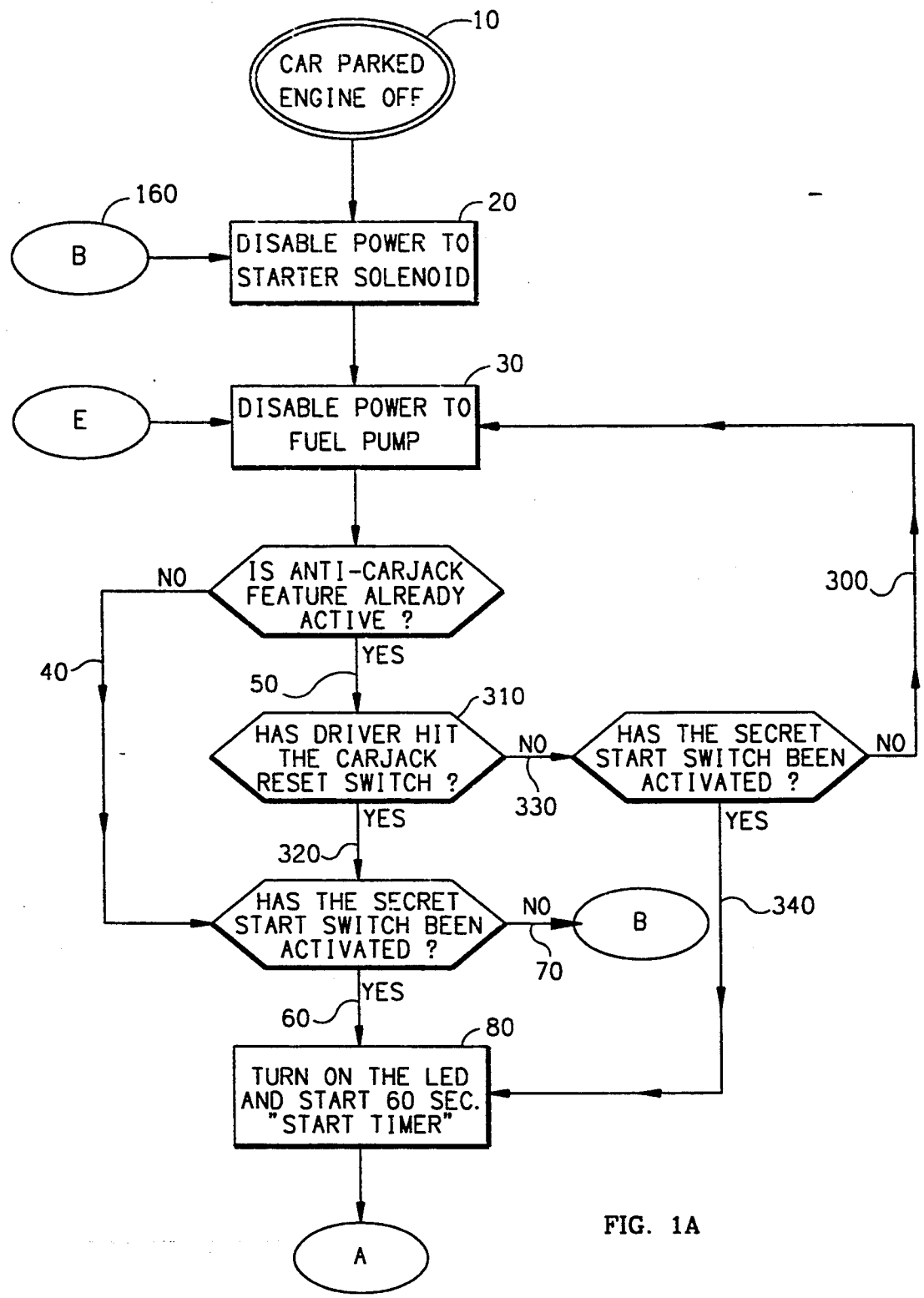
FIGS. 1A-1C are functional diagrams setting forth the basic principles of the system.
Figure 1B:
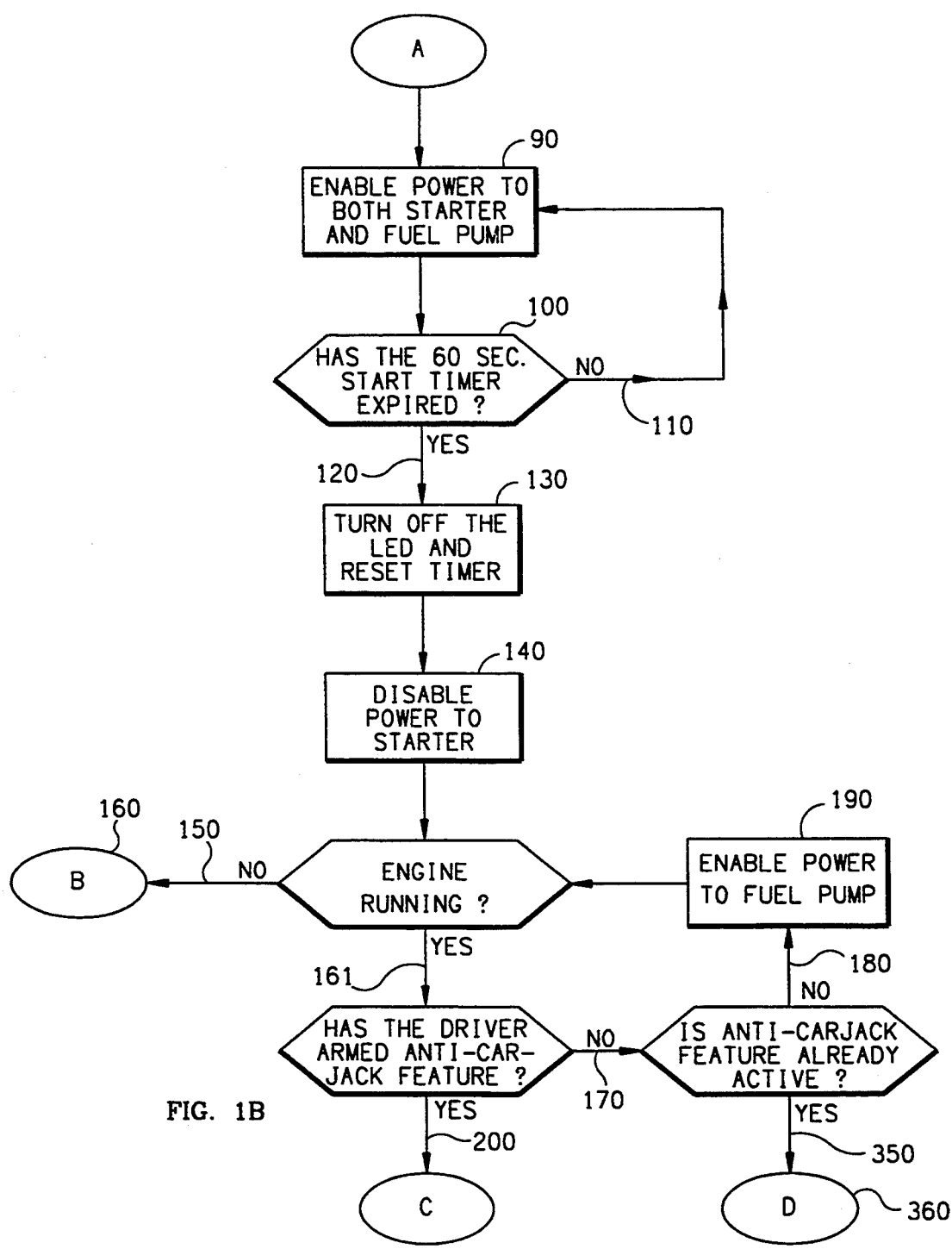
Figure 1C:
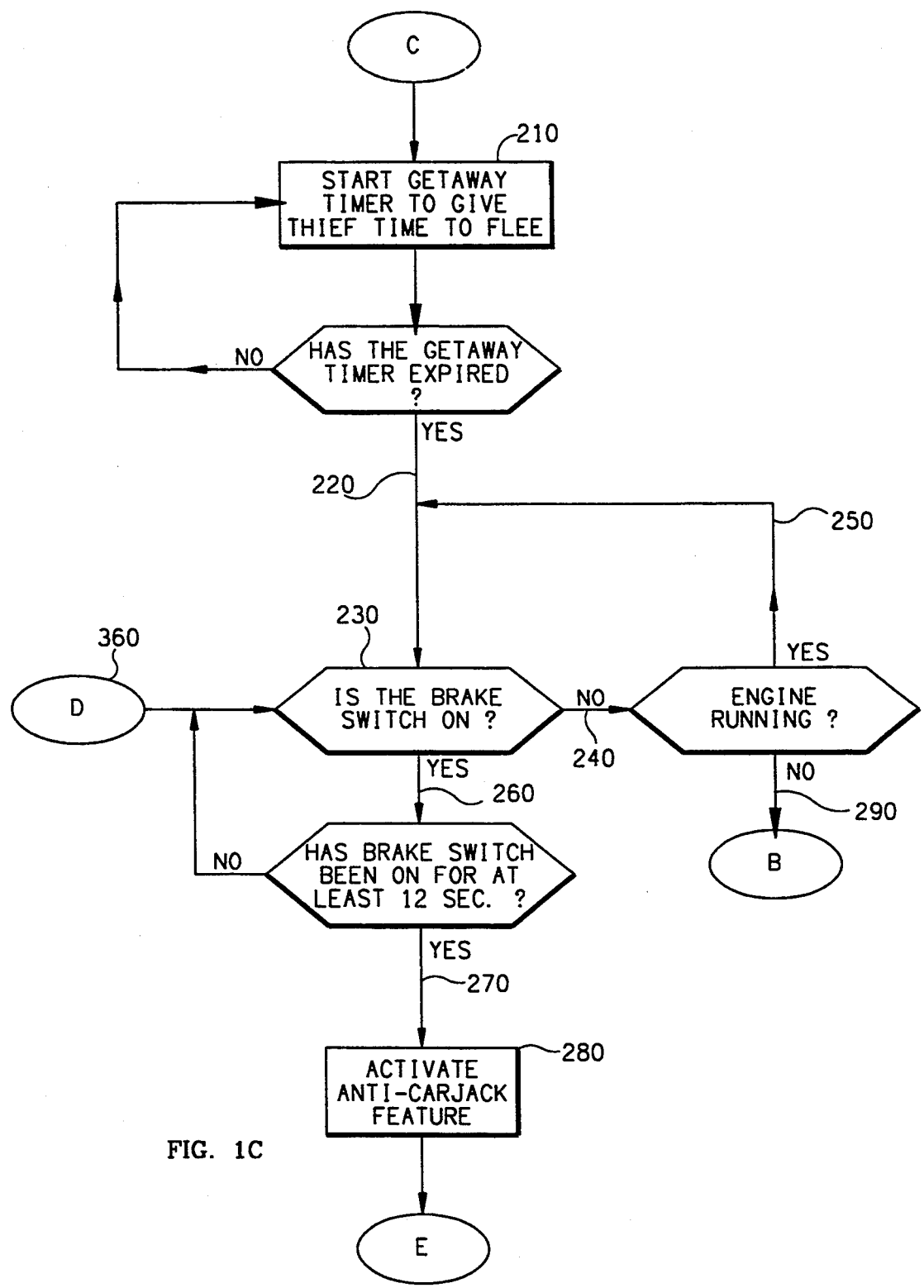

As shown in FIGS. 1A-1C, the system and method of the presently preferred embodiment can be best understood in terms of functional activity. It should be understood that the flow charts depicted in FIGS. 1A-1C are convenient means for describing the control process of the present invention. As such, it can be appreciated that the physical circuitry chosen to implement these flow chart steps can take many forms. While the embodiments, as discussed in greater detail in FIGS. 2 and 3, take the form of electrical circuits, those of ordinary skill in the art could also choose to use micro-electronics or a micro-computer to accomplish the same means.

Referring now to FIGS. 1A-1C, the anti-theft system and method of the present invention involves the following logic sequence. With the car parked and engine off 10, power to the starter circuit 20 and fuel pump circuit 30 are disabled. Assuming normal conditions for the time being, the anti-cadacking feature is inactive 40. Later on in the discussion, the situation of where the antiocarjack feature is already active 50 will be described. Until a secret start switch has been activated 60, the system continues to interrupt power to the starter and fuel pump 70. This prevents the car from being started without first hitting the secret start switch. This secret start switch is located such that only the driver (and those he chooses to authorize to drive his car) knows where the switch is. As will be discussed in greater detail in conjunction with FIGS. 2 and 3, the secret start switch of the present invention takes the form of a membrane switch concealed beneath the automobile interior carpeting or the like. It can be appreciated that disabling both the starter and the fuel pump makes the system more difficult to defeat.

Once the secret start switch has been activated 60, the system proceeds to turn on an acknowledgement LED and start a sixty second timer 80. The acknowledgment LED is provided to give the driver positive feedback that he has indeed activated the secret start switch 60. Because the secret start switch is designed to be concealed and extremely difficult for thieves to detect, it is likely that the driver himself will have difficulty determining, through sense of touch alone, whether he has activated the switch or not. Therefore, the acknowledgement LED provides the driver with positive feedback that he has indeed initiated the starting sequence.

Once the starting sequence has been initiated, the system provides power to the starter and fuel pump circuits 90. During the sixty seconds provided on the start timer 100, 110, power is provided to the starter and fuel pump 90 to allow the driver to start the vehicle. Once the start timer expires 120, the LED is turned off 130 and power to the starter is disabled 140. Should the driver be unable to start the car 150 during the sixty second start period, the whole sequence must be restarted 160. In practice, this means the driver must again hit the secret start switch 60.

Assuming normal conditions, once the driver has successfully started the engine 160 he will proceed to drive away. Thus, the driver will not try to arm the anti-carjacking feature 170 nor will the anti-carjacking feature already be active 180. Under these normal conditions, power is continuously provided to the fuel pump 190. If the driver shuts off the car 150, he will need to restart the sequence 160 to start the engine again.

However, now assume the driver has started the engine 160 and is faced with a thief. In this situation, the driver can arm the anti-carjacking feature 200 by activating the car jacking switch. The car jacking switch, unlike the secret starting switch, is provided in a readily accessible location. Since the car jacking switch is designed to be activated by the driver in the event that someone attempts to steal his vehicle while it is running, it is important that the switch either be easy to access in a panic situation or that it be activated automatically if the driver is forced from the car. The location and type of car jacking switch will be discussed in greater detail in conjunction with FIGS. 2 and 3. Regardless, once the car jacking feature has been armed 200, a getaway timer is activated 21 0. The getaway time is designed to allow the thief to drive a sufficient distance away from the victim to help insure that the victim is out of danger before the car jacking sequence takes its effect. This getaway time also allows the victim a chance to contact police before the car jacking sequence takes its effect. In the presently preferred embodiment, the getaway timer is set for one minute, while in an earlier experimental version the getaway timer was set for two minutes and forty seconds. Through informal driving tests, it was found that a delay of approximately one minute ensured the vehicle was allowed to travel a sufficient distance that the victim would be out of harm's way, while a delay of longer than three minutes may allow the thief to get too far away for police to respond properly. Thus, it is believed that any length of time between one to three minutes would likely suffice.

Once the getaway timer expires 220, the car jacking sequence is armed. The first task of the car jacking sequence is to determine whether or not the brake switch is on 230. If the brake switch is not on 240 and the car is still running 250, no action is undertaken. However, if the brake switch is on 260 and has been one for at least twelve seconds 270, there is a fair likelihood that the thief has either brought the vehicle to a complete stop or has begun slowing the vehicle significantly. Having given the thief time to flee the scene of the robbery 220 and having determined that the vehicle is either stopped or is slowing 270, the car jack function is activated 280. Once the car jack function is activated 280, power to the fuel pump is disabled 30, causing the car to stall. Once the car stalls, the thief will be unable to restart the car until the secret start switch is activated 60. It can be appreciated that, while other means of stalling the engine could be employed, interrupting the fuel supply is a very effective antitheft measure since it is quite difficult to override a fuel pump intercept.

It can be appreciated from the foregoing description that allowing the thief to flee in the vehicle before the system stalls the engine reduces the likelihood that the thief will be able to retaliate against the victim. Also, because the car jack feature 280 is not activated until at least twelve seconds of continuous brake pedal actuation has been detected 270, the risk that the vehicle will go out of control at high speeds is reduced. Specifically, since disabling the fuel pump will cause the vehicle to stall immediately, it is important to prevent the vehicle from being stalled while travelling at high speeds. As such, it can be appreciated by those of ordinary skill in the art that other means could be used to determine that the vehicle has slowed significantly or stopped. For example, vehicle speed or driven wheel speed may be used as an indicator that the vehicle is no longer travelling at high speeds, rather than relying upon the brake switch. In this embodiment, testing has revealed that a brake switch actuation of at least twelve seconds is a reliable predictor of vehicle speed; conversely, brake switch activation for less than twelve seconds often means the vehicle may still be travelling too fast to safely disable the engine.

The preceding discussion assumed normal operating conditions were present when the car was started, and that the car was forcibly taken from the driver by a thief. Presuming the thief now is driving away with the car, two situations may occur. First, the thief will unknowingly stall the vehicle by pressing the brake pedal for more than twelve seconds 270, 280, 30. Or, the thief may shut off the car before the anti-carjack feature stalls the engine 290. In this second situation, the thief is unaware of the anti-carjacking system and likely believes he has succeeded in his crime. However, unless he knows where the secret start switch is hidden, he will be unable to restart the car. Specifically with the car parked 10 and the anti-carjack feature already active 50, the thief would not be able to start the car unless he hits the secret switch 300. Since the thief is unable to restart the car regardless of whether the car was stalled by the anti-carjack feature or by the thief turning off the engine, the car will likely be recovered and returned to the victim. Once the victim received possession of this car, he can reset the carjacking system. This can be accomplished by activating a reset switch 310 hidden on the vehicle. Since the reset switch disarms the carjack feature, the switch should be well hidden. Preferably, it should be located outside of the passenger compartment so that it is very difficult for the thief to find. As such, the reset switch could be hidden in the trunk compartment. In the alternative, the carjacking circuit could be wired such that it automatically resets when the ignition is turned off. Since the secret start switch must always be activated to start the car, allowing for automatic resetting of the carjack feature does not unduly compromise the integrity of the system, while reducing the complexity for the user. These various circuitry options will be discussed in greater detail in conjunction with FIGS. 2 and 3. Regardless of the carjack reset scheme employed, having reset the system 320, the driver will be able to start the car as usual: depressing the secret start switch 60 turns on the LED and start timer 60 and provides power to the starter and fuel pump 90.

One more situation should be noted: the driver may accidentally arm the anticarjack feature 200. This could occur through carelessness if the carjack switch is mounted out in the open, or it could occur through inadvertence if the carjack switch is mounted such that it is automatically activated. Regardless, if the anticajack feature is already active 50 and the driver has not yet reset the feature 330, he can still start the car by activating the secret start switch 340. The only thing that makes this situation different from a normal starting situation is that the anti-carjacking feature is already active 50. As a consequence, with the engine running 160 and the cadack switch in the normal "off" position 170, having the anti-carjacking feature already active 350 bypasses the getaway timer 360. As such, pressing the brake pedal for more than twelve seconds 230, 260, 270, causes the fuel pump to be disabled 30 and stalls the engine. However, since the driver knows how the system works, he will be aware of this feature and be able to calmly pull off to the side of the road and reset the system 320. In this way, the driver, knowing the location of the secret start switch, can restart the car in the event that he has accidentally activated the anti-carjack feature without having to first reset the system.

Figure 2:
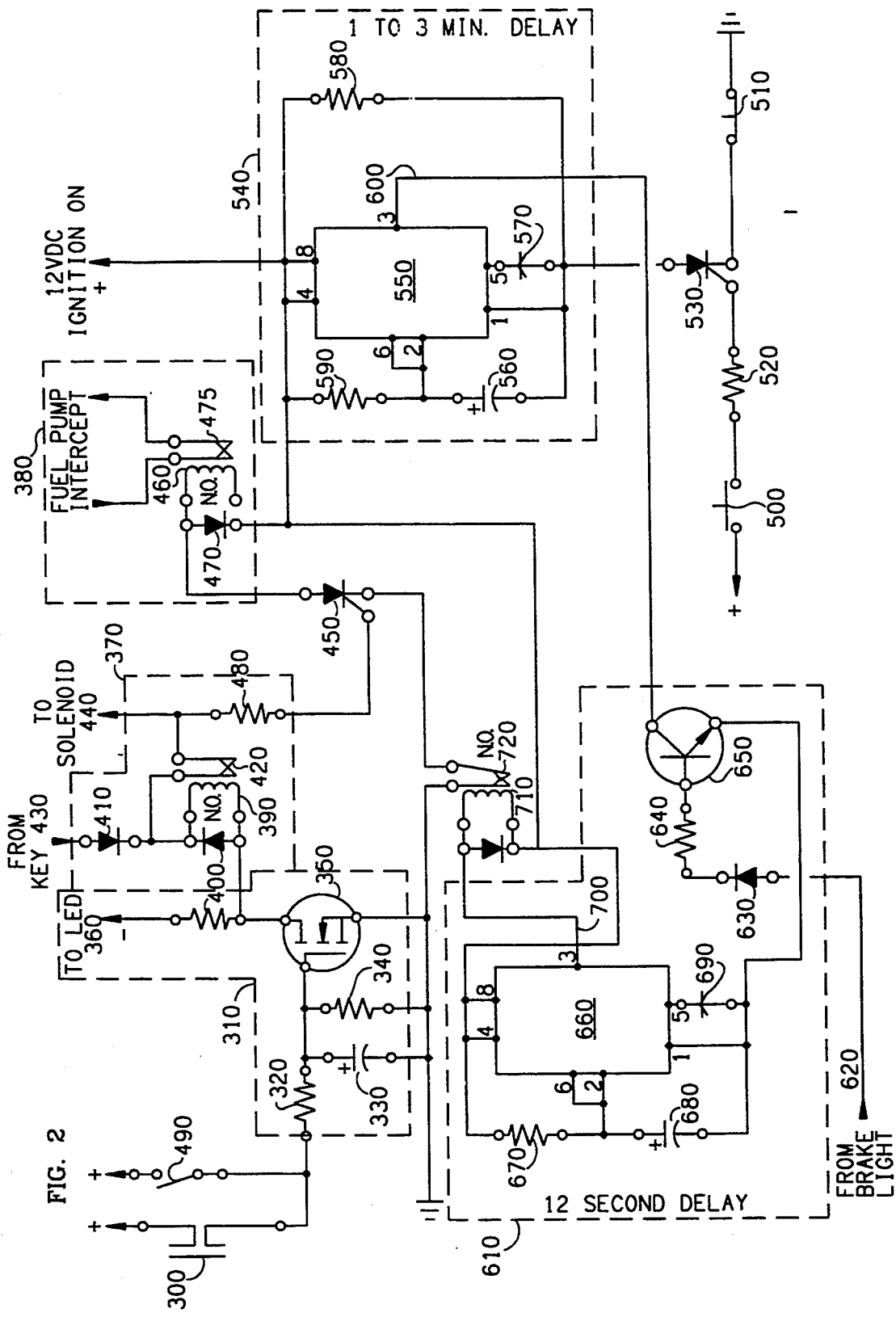
FIG. 2 is a circuit diagram detailing one embodiment of the invention.
Figure 3:
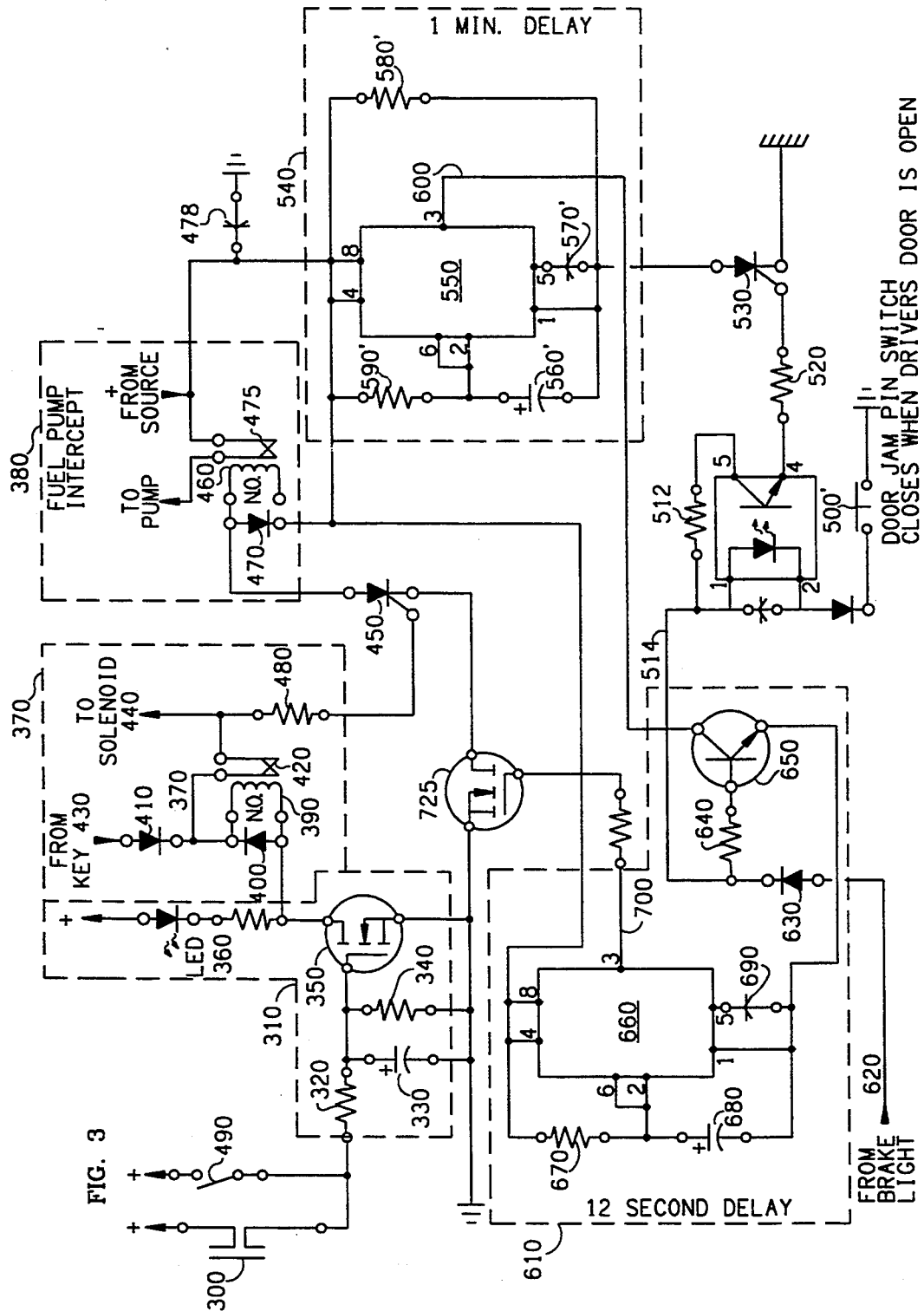
FIG. 3 is a circuit diagram detailing an alternative embodiment of the invention.

The circuits chosen to embody the present invention are detailed in FIGS. 2 and 3. One embodiment, shown in FIG. 2, employs separate car jack activation and reset switches, while the other embodiment, shown in FIG. 3, employs automatic car jack activation and resetting. As shown in both figures, a membrane switch 300, concealed beneath the vehicle carpeting, is the secret start switch. A membrane switch 300 has been selected because it provides a very effective means for concealing a switch beneath fabric or carpeting. Since the membrane switch essentially has no detectable thickness or tactile feel when activated, a thief would have great difficulty determining the location of the membrane switch by simply feeling around on the carpet. Once the secret membrane start switch 300 is depressed, power is provided to the start timer circuit 310. The start timer circuit 310 comprises a 1 KΩ resistor 320 in parallel with a 100 mFd capacitor 330 and 1 MΩ resistor 340 tied to the gate of a MOSFET 350. Depressing the membrane switch 300 charges the capacitor 330 which provides power to the gate of the MOSFET 350. The RC time constant of the circuit provides power to the gate of the MOSFET 350 for approximately sixty seconds before the capacitance charge is depleted. This sixty second start timer 310 powers an acknowledgement LED 360. The acknowledgement LED 360 remains lit during the sixty second start time to provide positive feedback to the vehicle driver that he has indeed activated the secret start switch 300 and that the car is ready to be started. It can be appreciated that sixty seconds is a convenient period of time to allow the driver to start the car.

The start timing circuit 310 also provides power to the starter solenoid circuit 370 and fuel pump circuit 380. The starter solenoid circuit 370 includes a 75 milliamp relay 390 in parallel with diodes 400 and 41 0. When power is provided to the relay 390, the starter contacts 420 are pulled closed, completing an electrical path between the ignition power lead 430 and starter solenoid lead 440. The starter contacts 420 are rated for 30 Amps, as would be expected for a high power circuit such as the starter. As can be appreciated by those of ordinary skill in the art, the ignition power lead 430 provides power to the starter solenoid lead 440 when the driver turns the key from an "off" position to a "start" position or "run" position. In this respect, the circuit of the presently preferred embodiment does not interfere with the normal starting operation of the starter once the secret start switch is activated.

Via the starter solenoid circuit 370, the start timer circuit 31 0 also provides power to the fuel pump circuit 380. The fuel pump circuit 380 includes a latch device 450 tied to a 75 milliamp relay 460 in parallel with a diode 470. When power is provided to the relay 460 via the latch 450, 30 Amp rated contacts 475 are closed, completing the fuel pump power circuit. In FIG. 3, an isolation capacitor 478 is provided to help reduce undesirable circuit surges, and a common wire is used to provide ground to the fuel pump circuit 380 and delay circuit 540. Such elements are clearly within the design choice of one skilled in the art.

The fuel circuit latch 450, in this case a SCR, latches "on" whenever power reaches it through the starter circuit 370. While the start timer circuit 310 is still active, power is provided to the starter and fuel pump circuits 370, 380 via the start timer. Likewise, if the car is successfully started, the electrical path from the ignition lead 430, through relay 390 and 1 KΩ resistor 480 provides power to the fuel pump circuit 380. So, power is provided to the fuel pump circuit 380 while the start timer 310 is active and, after the car is started, power is provided via the ignition circuit 370. However, if the vehicle is not successfully started before the start timer 310 expires, power to the starter circuit 370 and fuel pump circuit 380 is interrupted. Thus, if the driver is unable to start the car within the sixty seconds provided by the start timer 310, the membrane switch 300 must be reactivated in order to initiate another starting sequence.

Because the location of the secret start switch 300 is supposed to remain a secret to all others besides the driver and those he authorizes to use the car, it may be preferable to provide a secondary valet switch 490. This switch could be located under the dashboard or in a similarly inconspicuous place. The switch 490, once closed, bypasses the membrane switch 300 and allows continuous power to be provided to the MOSFET 350. Since the valet switch essentially overrides the antitheft features of the system, providing a simple toggle switch for the valet would not be preferable unless it is very well concealed. As an alternative to concealing a toggle switch, an alternative form of switch could be employed. For example, the switch could take the form of two contacts where the path between the contacts is completed by a magnetic bar or common automobile fuse. The magnet or fuse could be carried in the glove compartment, and could be installed across the contacts by the driver when handing his car over to a valet. Since people often carry odd items in their glove compartment, it would be difficult for a thief to conclude that a magnet or fuse laying loose in the glove compartment was for the purposes of overriding the antitheft system. The valet switch 490 powers both the MOSFET 350 and acknowledgment LED 360 continuously. Since the valet switch 490, once activated, completely bypasses the membrane switch, acknowledgement LED 360 remaining continuously lit reminds the driver that he has forgotten to disable the valet switch. Thus, the valet feature is designed to be difficult to invoke without knowledge of its location and operation, and is designed to prevent the driver from accidentally leaving the valet switch active.

So far, the normal operation features of the system have been described. Now, the carjacking features will be described. Remembering that the secret switch 300 was depressed to allow the driver to start the car, another, different switch 500 is provided for the driver to activate if someone should attempt to steal the vehicle from the driver after the car has been started. As shown in FIG. 2, this carjacking switch 500, unlike the secret start switch 300, is easy to reach. It can be mounted out in the open on the dashboard, or under the carpet near the pedals for activation by the driver's foot. As was discussed earlier in conjunction with FIGS. 1A-1C, the can still hit the secret start switch to start the car, and later he can hit the reset switch 510. As was also discussed before, the carjack reset switch 510 allows the driver to disarm the car jack feature after recovering the car from the thief. In the alternative, to implement an automatically arming as resetting carjacking feature as shown in FIG. 3, the carjacking switch can be integral with the existing door jam pin switch 500' which serves to activate illumination of interior lamps when the car door is opened. To reduce the chance that the driver may accidentally activate the system without meaning to do so, an opto-isolator circuit 512 is provided which becomes active only when both the door jam pin switch 500' is closed (door opened) and the brake pedal or brake lamp 514 are on. Requiring the driver of the car to hold his foot on the brake pedal while opening the car door to activate the car jacking feature reduces the chances that simply starting the car to warm it up and getting out to load packages or scrape the windows will result in the arming of the carjack feature. Similarly, as implemented in FIG. 3, the carjack feature is automatically reset upon turning off the ignition, obviating the need for the reset switch 510 shown in FIG. 2. From the different arming and resetting configurations discussed herein, it can be appreciated by one of ordinary skill in the art that other means of arming and resetting the carjacking feature could be employed encompassing both automatic, semi-automatic and fully manual means. For example, arming and resetting could be accomplished through the use of a remote radio transmitter similar to those types of transmitters used in known auto alarms and remote starting systems. Of course, if a remote transmitter is employed, the driver must not carry that transmitter on his key ring, for fear that the carjacker will commandeer the vehicle with the keys and the transmitter in the ignition. The important point to be appreciated is that arming the carjacking feature should not be so cumbersome or involved that the driver will be unable to arm the system when confronted by a carjacker. Likewise, the disarming feature should not be so easy to uncover that the thief will be able to defeat the system completely. Here, because the secret start switch 300 must always be activated to start the car regardless of whether the carjacking feature is active or inactive, the carjacking reset method employed does not compromise the secret start switch's theft deterrent capabilities.

The following description details the anti-carjacking features of the present invention, and assumes that the carjacking feature has been activated because the driver is indeed being forced to relinquish his vehicle to a thief. Once the carjacking feature is activated, power flows through 1 KΩ resistor 520 and latches SCR 530. SCR 530 remains latched until the cadacking feature is reset, either by depressing reset switch 510 as shown in FIG. 2 or by turning off the ignition as shown in FIG. 3. In FIG. 2 SCR 530 remains latched until the reset switch 510 is depressed, regardless of whether the car is shut off or the battery disconnected The benefits of this configuration will be described later.

Having been latched, power flows through SCR 530 to getaway timer circuit 540. The getaway timer circuit 540 is designed to provide sufficient flight time for the thief to flee far enough with the stolen vehicle that he is out of range of the victim before the carjacking feature causes the car to stall. In the embodiment shown in FIG. 2, the getaway timer includes a 555 timer IC 550 with a 100 mFd capacitor 560, a 0.01 mFd capacitor 570, a 470 Ω resistor 580 and a 1 MΩ resistor 590 tied to the various pins of the chip. This configuration allows the timer chip 550 to clock two minutes and forty seconds before shutting off and causing output pin-3 600 to drive low. In FIG. 3, the values of the resistors and capacitors 560'–590' provides for a one minute clock before timer chip 550 shuts off and causes output 600 to drive low.

Once the getaway timer 540 has expired, the system is readied to stall the vehicle. But, to ensure that the vehicle is not stalled when travelling at high speeds, a brake switch detection and timing circuit 610 is provided. The low voltage provided from the output of the getaway timer 540 only reaches the rest of the circuit 610 if the brake switch input 620 is activated. Once the brake switch 620 is activated, power flows through diode 630 and 1 KΩ resistor 640 to the gate of transistor 650. Once the transistor gate 650 is powered, the low voltage signal from the expired getaway timer circuit 540 flows to a twelve second timer circuit comprising a 555 timer chip 660 with a 1 MΩ resistor 670, a 10 mFd capacitor 680 and 0.01 mFd capacitor 690 tied to its various pins. If the brake switch 620 remains on for twelve seconds after the getaway timer has expired 540, the twelve second timing circuit 610 causes output pin-3 700 of timer chip 660 to go low, completing the circuit to 44 milliamp relay 710 which pulls open the normally closed carjacking contacts 720 depicted in FIG. 2. In FIG. 3, the low signal on pin 700 causes transistor 725 to shut off. Once the electric circuit is interrupted by either the opening of relay 720 or the shutting off of transistor 725, the electrical circuit to SCR 450 is interrupted, causing SCR 450 to unlatch and remain unlatched. Once SCR 450 unlatches, power from the starter circuit 370 no longer reaches the fuel pump circuit 380, and the fuel pump shuts off. Obviously, with the fuel supply shut off, the vehicle will stall almost immediately. Thus, ensuring the brakes have been on for a certain length of time helps ensure the car has already stopped or is at least travelling sufficiently slow so that the driver will be able to safely manuever the stalled vehicle. As an added feature, an additional circuit could be included that causes the horn to honk and the headlamps to flash once the vehicle is forcibly stalled by the carjacking feature. This additional circuit could be activated the same time that the fuel circuit is disabled. By drawing attention to the vehicle once it has stalled, the thief would likely panic and flee on foot without first trying to figure out how to restart the car, much as less before trying to strip the car of salable parts such as the wheels, the radio, and the like.

When implemented as depicted in this disclosure, the thief will be unable to restart the vehicle once it has been stalled, regardless of whether he locates the secret membrane switch 300 or valet switch 490. This is because SCR 530 remains latched, powering relay 71 0 which forces contacts 720 to remain open and forces SCR 450 to remain in an unlatched state. Only by hitting the carjacking reset switch 510 provided in FIG. 2 or by turning off the ignition as diagramed in FIG. 3 will power to be dropped to SCR 530, unlatching it. It should be appreciated that, in the circuit of FIG. 2, the SCR 530, once enabled, remains on regardless of whether the vehicle is running or not, and regardless of whether the keys remain in the ignition. Thus, the thief cannot reset the carjacking circuit by simply turning off the ignition, nor can he reset the carjacking circuit by learning the location of the membrane or valet switches 300, 490. Since SCR 530 and timer 550 remain active until reset, the vehicle's battery will likely be drained down if the car sits for several days while the carjacking feature is active. However, draining the battery makes it even more difficult for the thief to restart the car once it has stalled! It is doubtful that a thief would go through the trouble of getting a jump start or replacing the dead battery with a fresh battery even if the car remain unrecovered for several days. Moreover, once the car stalls and the battery drains down, the thief will be unable to restart the car even if he replaces the battery because only reset switch 510 will unlatch SCR 530 and only the secret start switch 300 will allow power to the starter and fuel pump circuits 370, 380. When the car is finally recovered by the rightful owner, the owner can simply press the carjacking reset switch 510 to unlatch SCR 530 and reset the system. This feature makes the circuit of FIG. 2 twice as difficult to defeat as that of FIG. 3, but also increases the circuit's complexity and makes it slightly more cumbersome for the driver. One of ordinary skill in the art can appreciate that design choices can be exercised to determine whether or not to include this added level of theft prevention over and above the theft prevention provided by the secret start switch 300. Once the carjacking feature is reset, by either hitting the reset switch of FIG. 2 or by turning off the ignition as shown in FIG. 3, the car can be started using the normal operating sequence: depressing the membrane switch 300 and starting the car within the allotted sixty second start time.

Several features of the present invention should be appreciated from the preceding discussion. First, while a microprocessor could be utilized to implement a logic scheme similar to that described herein, the discrete circuit of the presently preferred embodiment is less expensive. Second, two separate 555 timer chips 550, 660 have been utilized rather than a dual 555 timer chip (commonly referred to as a 556 chip). This is because of the manner in which the getaway and brake timing circuits 540, 610 are implemented: the getaway timer 540 goes low to activate the brake timer 610 and the brake timer 61 0 goes low to activate the carjacking relay 720. A 556 dual timer chip possess neither sufficient stability nor sufficient power inputs to perform both of these functions. Third, a membrane switch 300 has been chosen for the secret starter switch because it has essentially has no discernable thickness and provides no tactile feel. Thus, the switch can be concealed beneath the carpet or another flexible surface without leaving a telltale "bump" for a thief. Fourth, the acknowledgement LED 360 is lit when the car is able to be started. This is different from most commonly used antitheft devices, which turn on an LED or lamp when the car's starting system is disabled. Thus, having the LED illuminate when the car is able to be started fools the thief into thinking he's accidentally armed the system rather than disarmed the system in the event he finds the membrane or valet switch. Fifth, having the LED illuminated when the car is ready to be started provides a reminder to the driver in the event he accidentally leaves the valet switch in the bypass mode. Sixth, the getaway timer 540 provided in the carjacking function allows the thief to travel for some time before the car stalls, helping to ensure the victim is out of range should the thief try to retaliate against the victim. Seventh, once the carjacking function has been armed, the fuel system 380 is not shut off unless the brake switch 620 is depressed continuously for at least twelve seconds. This helps ensure that the vehicle is stopped or is at least slowing before the engine is stalled. In this way, risk of the thief losing control of the vehicle at high speeds is reduced. Eighth, even if the driver is unable to activate the carjacking switch 500 before being forced from the vehicle, the car cannot be restarted by the thief if he shuts off the car because the secret start switch is virtually undetectable. Ninth, if the driver does successfully activate the carjacking switch 500 but the thief doesn't depress the brake pedal 620 for more than twelve seconds after fleeing, the thief will still be unable to restart the car once he shuts it off because of the secret start switch. Tenth, leaving the carjacking SCR 530 active once the carjacking sequence has been activated causes the battery to drain down, making the car impossible to start if the thief turns off the car and tries returning to it later to restart. And finally, allowing the driver to restart the car by hitting the secret switch despite the carjacking circuit being active allows the driver to drive his car to a safe place, like his home or a police station, before having to reset the carjack switch or turn off the ignition.

It can be appreciated that the antitheft or anti-carjacking features of the present invention could also be implemented as separate systems. For example, an anti-theft system using the concepts of the present invention would disable the starter and fuel pump circuits 370, 380 unless a secret switch 300 is activated. Likewise, an anti-carjacking system using the concepts of the present invention would allow the driver to activate the carjacking circuit if he is forced to relinquish his vehicle. Once activated, the anti-carjacking system would disable power to the fuel pump circuit 380 after a predetermined period of time has elapsed. Or power could be disabled after the predetermined time period has expired and the system has determined that the car is going slow enough to reduce the likelihood that the thief will lose control of the vehicle once it is stalled. Thus, one of ordinary skill in the art could adapt the present invention to suit a variety of different needs without departing from the spirit or scope of the invention as disclosed herein. Moreover, it should be appreciated that the flow charts and circuit diagrams provided herein were provided primarily for the purposes of discussion and in no way presume to depict the only ways of implementing the present invention. Indeed, one of ordinary skill in the art could rework the circuit diagrams provided herein to optimize design parameters such as number of components employed, length of interconnect wires, size of circuit boards, and the like. Similarly, while the presently preferred embodiment contemplates timing the duration that the brake switch is continuously depressed to indicate the vehicle is stopped or has at least slowed significantly, other indicators such as non-driven wheel speeds or vehicle speed could be employed to indicate the vehicle is at or below a speed deemed acceptable for shutting off the engine.

We claim:

1. A vehicle anti-theft system for preventing unauthorized starting of the vehicle and for preventing unauthorized flight of the vehicle, the vehicle having a first circuit for starting the engine and a second circuit for allowing the engine to run once started, said system comprising:

first interrupt means for interrupting electrical power to the first circuit;

second interrupt means for interrupting electrical power to the second circuit;

sequence means, electrically connected to said first and second means, including a starting sequencer means for permitting starting of the engine and allowing running of the engine and also including a flight prevention sequencer means for prohibiting running of the engine, wherein said sequence means comprises:

a normal operation switch, electrically connected to said first and second interrupt means, said normal operation switch actuable by an authorized vehicle user to initiate said starting sequencer means;

a theft switch, electrically connected to said second interrupt means, said theft switch actuable by the authorized vehicle user to initiate said flight prevention sequencer means;

wherein said flight prevention sequencer comprises means for delaying activation of said second interrupt means until a predetermined flight period has expired;

wherein said flight prevention sequence means further comprises:

means for detecting slowing or stopping of the vehicle wherein said delay means delays activation of said second interrupt means until said predetermined flight period has expired and said detection means detects a slowing or stopping of the vehicle;

wherein said detection means comprises:

a brake switch actuable by a vehicle user when the user slows or stops the vehicle; and means for timing the duration for which said brake switch is activated, wherein said brake switch being activated for a predetermined continuous braking time comprises said detected slowing or stopping.

2. An anti-theft device for preventing the starting and driving away of a motor vehicle by a thief, the vehicle having a starter circuit for starting the motor, having a fuel pump circuit for delivering fuel to the motor and having a brake switch connected to a brake pedal for indicating the vehicle is being slowed or stopped, said device comprising:

a starter circuit interrupt electrically connected to the starter circuit;

a fuel circuit interrupt electrically connected to the fuel pump circuit;

a hidden start switch electrically connected to said starter circuit interrupt and said fuel circuit interrupt; and a carjack switch electrically connected to said fuel circuit interrupt;

wherein said starter circuit interrupt and said fuel circuit interrupt disable the starter and fuel pump circuits until said hidden starter switch is activated, and wherein activation of said hidden start switch disables said starter circuit and fuel circuit interrupts for a predetermined start time to allow starting of the vehicle during said start time, and wherein said starter circuit interrupt disables the starter circuit after expiration of said start time regardless of whether the vehicle has been started or not, and wherein said fuel circuit interrupt disables the fuel pump circuit after expiration of said start time if the vehicle has not been started during said start time, and where said carjack switch is activated by the vehicle's authorized user when the thief takes the vehicle after it has been started, and wherein activation of said carjack switch causes said fuel circuit interrupt to disable the fuel pump circuit after expiration of a predetermined delay time, the anti-theft device further comprising:

a brake switch detector, electrically connected to the brake switch and said fuel circuit interrupt, for detecting actuation of the brake switch; and a brake switch time, electrically connected to said brake switch detector, for timing the duration the brake switch is continuously activated;

wherein said fuel circuit interrupt disables the fuel pump circuit after expiration of said predetermined delay and also when said brake switch time has timed the actuation of the brake switch by means of the brake switch detector for at least a predetermined braking period of time.

* * * * *

UNITED STATES PATENT AND TRADEMARK OFFICE
CERTIFICATE OF CORRECTION

PATENT NO. : 5,412,370  
DATED : May 2, 1995  
INVENTOR(S) : Berman, et al

It is certified that error appears in the above-indentified patent and that said Letters Patent is hereby corrected as shown below:

| | |
|---|---|
| Column 3, line 27 | Please delete "anti-cardacking" and insert therefor, --anti-carjacking--. |
| Column 3, line 29 | Please delete "antiocarjack" and insert therefor, --anti-carjack--. |
| Column 5, line 51 | After start timer, please delete "60" and insert therefor, --80--. |
| Column 5, line 65 | Please delete "cadack" and insert therefor, --carjack--. |
| Column 6, line 45 | Please delete "41 0" and insert therefor, --410--. |
| Column 7, line 65 | After "the", please insert --driver--. |
| Column 8, line 51 | Please delete "cadacking" and insert therefor, --carjacking--. |

UNITED STATES PATENT AND TRADEMARK OFFICE
CERTIFICATE OF CORRECTION

PATENT NO. : 5,412,370
DATED      : May 2, 1995
INVENTOR(S) : Berman, et al

It is certified that error appears in the above-indentified patent and that said Letters Patent is hereby corrected as shown below:

Column 8, line 56    After "disconnected", please insert therefor --.--.

Column 9, line 53    Please delete "71 0" and insert therefor, --710--.

Column 10, line 39   Please delete "61 0" and insert therefor, --610--.

Signed and Sealed this

Second Day of July, 1996

Attest:

BRUCE LEHMAN

Attesting Officer    Commissioner of Patents and Trademarks